(12) United States Patent
Todoroki et al.

(10) Patent No.: US 10,954,385 B2
(45) Date of Patent: Mar. 23, 2021

(54) HEAT-RESISTANT MILLABLE SILICONE RUBBER COMPOSITION

(71) Applicant: SHIN-ETSU CHEMICAL CO., LTD., Tokyo (JP)

(72) Inventors: Daichi Todoroki, Annaka (JP); Yoshiaki Koike, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 43 days.

(21) Appl. No.: 16/338,303

(22) PCT Filed: Oct. 18, 2017

(86) PCT No.: PCT/JP2017/037690
§ 371 (c)(1),
(2) Date: Mar. 29, 2019

(87) PCT Pub. No.: WO2018/079376
PCT Pub. Date: May 3, 2018

(65) Prior Publication Data
US 2020/0024452 A1  Jan. 23, 2020

(30) Foreign Application Priority Data

Oct. 28, 2016 (JP) .............................. JP2016-211430
Apr. 10, 2017 (JP) .............................. JP2017-077420

(51) Int. Cl.
C08L 83/04 (2006.01)
C08G 77/20 (2006.01)
C09C 1/36 (2006.01)
C08K 3/22 (2006.01)
C08K 5/14 (2006.01)
C08K 3/36 (2006.01)

(52) U.S. Cl.
CPC .............. *C08L 83/04* (2013.01); *C08G 77/20* (2013.01); *C08K 3/22* (2013.01); *C08K 3/36* (2013.01); *C08K 5/14* (2013.01); *C09C 1/3653* (2013.01); *C08K 2003/2213* (2013.01); *C08K 2003/2265* (2013.01); *C08L 2201/08* (2013.01)

(58) Field of Classification Search
CPC ..... C08L 83/04; C08L 2201/08; C08G 77/12; C08G 77/20; B01J 23/40; C08K 5/14; C08K 3/36; C08K 2003/2213; C08K 2003/2268; C09C 1/3653
See application file for complete search history.

(56) References Cited

U.S. PATENT DOCUMENTS

| 2010/0003484 | A1  | 1/2010 | Blanc et al. |
| 2012/0161090 | A1  | 6/2012 | Zhu et al. |
| 2014/0179870 | A1* | 6/2014 | Kondo ............... C08L 83/04 524/866 |
| 2016/0090465 | A1  | 3/2016 | Hasegawa et al. |
| 2016/0200940 | A1* | 7/2016 | Steinmann ........... C08L 83/04 428/447 |
| 2016/0289416 | A1  | 10/2016 | Guichard et al. |
| 2017/0210964 | A1  | 7/2017 | Ito et al. |

FOREIGN PATENT DOCUMENTS

| CN | 103874736 A | 6/2014 |
| CN | 105492552 A | 4/2016 |
| JP | 56-2349 A | 1/1981 |
| JP | 2006-21991 A | 1/2006 |
| JP | 2006-225420 A | 8/2006 |
| JP | 2006225420 | * 8/2006 |
| JP | 2008-291148 A | 12/2008 |
| JP | 2014-31408 A | 2/2014 |
| JP | 2016-30774 A | 3/2016 |
| JP | 2016-518461 A | 6/2016 |
| JP | 2016-530372 A | 9/2016 |
| TW | 200641055 A | 12/2006 |
| WO | WO 2010/140499 A1 | 12/2010 |
| WO | 2014189153 | * 11/2014 |
| WO | 2015024660 | * 2/2015 |

OTHER PUBLICATIONS

Freeman (Silicones, Published for The Plastics Institute, ILIFFE Books LTD, 1962) p. 27.*
International Search Report, issued in PCT/JP2017/037690, dated Dec. 5, 2017.
Written Opinion of the International Searching Authority, issued in PCT/JP2017/037690, dated Dec. 5, 2017.
Extended European Search Report dated May 26, 2020, in European Patent Application No. 17864518.0.
Office Action dated Nov. 12, 2019, in Japanese Patent Application No. 2018-547599.
Chinese Office Action and Search Report for Chinese Application No. 201780063813.7, dated Nov. 18, 2020, with English translation of the Office Action.

(Continued)

*Primary Examiner* — Kuo Liang Peng
(74) *Attorney, Agent, or Firm* — Birch, Stewart, Kolasch & Birch, LLP

(57) ABSTRACT

Provided is a millable silicone rubber composition capable of yielding a silicone rubber (cured product) superior in heat resistance. The composition contains:

(A) 100 parts by mass of an organopolysiloxane having at least two silicon atom-bonded alkenyl groups in one molecule, and having an average polymerization degree of not lower than 100;

(B) 5 to 100 parts by mass of a reinforcing silica having a specific surface area of not smaller than 50 m²/g;

(C) 0.01 to 10 parts by mass of a titanium oxide doped with a transition metal oxide of 0.01 to 5% by mass;

(D) 0.01 to 10 parts by mass of a cerium oxide and/or a cerium hydroxide; and (E) 0.01 to 10 parts by mass of a curing agent.

7 Claims, No Drawings

(56) References Cited

OTHER PUBLICATIONS

Taiwanese Office Action and Search Report for Taiwanese Application No. 106137093, dated Nov. 19, 2020, with English translation.

* cited by examiner

HEAT-RESISTANT MILLABLE SILICONE RUBBER COMPOSITION

TECHNICAL FIELD

The present invention relates to a millable silicone rubber composition capable of yielding a silicone rubber with a favorable heat resistance.

BACKGROUND ART

Silicone rubbers are widely used in various fields such as the fields of electric equipment, automobile, architecture, medical procedure and food, due to the fact that they have properties such as a superior weather resistance, electric property, low-compression set property, heat resistance and cold resistance. Particularly, a silicone rubber may be applied in, for example, a rubber contact(s) for use in a remote controller, a typewriter, a word processor, a computer terminal and a musical instrument; various rollers such as a roller for a copy machine, a developing roller, a transfer roller, an electrifying roller and a paper feeding roller; an antivibration rubber for an audio device or the like; and a packing for a compact disc used in a computer. Nowadays, there is a higher demand for silicone rubbers, and a silicone rubber with superior properties is expected to be developed.

It has been known that additives such as cerium oxide, cerium hydroxide, iron oxide and carbon black are added to further improve the heat resistance of a silicone rubber. However, the heat resistance of a silicone rubber under a high-temperature condition of 250° C. or higher has been insufficient, and desired is a silicone rubber capable of exhibiting a superior heat resistance even under such condition.

In Patent document 1 (Japanese Unexamined Patent Application Publication (Translation of PCT Application) No. 2016-518461), there is a description about improving the heat resistance of a silicone rubber by adding thereto titanium oxide and iron oxide of an amount of 0.1% by mass or smaller. However, there were only measured the amounts of formaldehyde, octamethylcyclotetrasiloxane, decamethylcyclopentasiloxane and dodecamethylcyclohexasiloxane generated after performing heating at 300° C. for an hour, and no description is made on changes in the properties of the silicone rubber. Further, an iron oxide is well known as a colorant for a silicone rubber, and is able to color the silicone rubber red even when used in a small amount, thus making it difficult to perform coloring with a desired color other than red.

In Patent document 2 (Japanese Unexamined Patent Application Publication No. 2014-031408), there is a description about improving the heat resistance of a silicone rubber by adding thereto cerium oxide and/or zirconium hydroxide. There, the silicone rubber had its properties measured after being kept in a dryer of 225° C. for 72 hours. However, the properties of the silicone rubber deteriorated under a higher temperature condition.

Patent document 3 (Japanese Unexamined Patent Application Publication No. 2006-021991) and Patent document 4 (WO2010/140499) disclose the use of a titanium oxide doped with a metal ion (metal salt) such as that of a transition metal. However, there are only disclosed uses as an intermediate-infrared radiation filter and a photocatalyst, for example, utilizing the optical properties thereof.

PRIOR ART DOCUMENTS

Patent Documents

Patent document 1: Japanese Unexamined Patent Application Publication (Translation of PCT Application) No. 2016-518461
Patent document 2: Japanese Unexamined Patent Application Publication No. 2014-031408
Patent document 3: Japanese Unexamined Patent Application Publication No. 2006-021991
Patent document 4: WO2010/140499

SUMMARY OF THE INVENTION

Problem to be Solved by the Invention

Therefore, it is an object of the present invention to provide a millable silicone rubber composition capable of yielding a silicone rubber (cured product) superior in heat resistance at 200° C. or higher, particularly at 250° C. or higher.

Means to Solve the Problem

In order to achieve the above objective, the inventors of the present invention diligently conducted a series of studies, and completed the invention as follows. That is, the inventors found that the heat resistance of a silicone rubber could be improved by adding to a silicone rubber composition, for example, a titanium oxide doped with an iron oxide of 0.01 to 5% by mass and a cerium oxide.

That is, the present invention is to provide the following millable silicone rubber composition and a cured product of such composition.

[1]
A heat-resistant millable silicone rubber composition comprising:
(A) 100 parts by mass of an organopolysiloxane having at least two silicon atom-bonded alkenyl groups in one molecule, and having an average polymerization degree of not lower than 100;
(B) 5 to 100 parts by mass of a reinforcing silica having a specific surface area of not smaller than 50 $m^2/g$;
(C) 0.01 to 10 parts by mass of a titanium oxide doped with a transition metal oxide of 0.01 to 5% by mass;
(D) 0.01 to 10 parts by mass of a cerium oxide and/or a cerium hydroxide; and
(E) 0.01 to 10 parts by mass of a curing agent.

[2]
The heat-resistant millable silicone rubber composition according to [1], wherein a content of the transition metal oxide in the silicone rubber composition is 0.001 to 0.1% by mass.

[3]
The heat-resistant millable silicone rubber composition according to [1] or [2], wherein the transition metal oxide is an iron oxide.

[4]
The heat-resistant millable silicone rubber composition according to any one of [1] to [3], further comprising a dispersant for filler, as a component (F).

[5]
The heat-resistant millable silicone rubber composition according to any one of [1] to [4], wherein the component (E) is an organic peroxide.

[6]

The heat-resistant millable silicone rubber composition according to any one of [1] to [4], wherein the component (E) is composed of an organohydrogenpolysiloxane and a platinum group metal catalyst.

[7]

A cured product of the heat-resistant millable silicone rubber composition according to any one of [1] to [6].

Effects of the Invention

According to the present invention, there can be obtained a silicone rubber composition capable of yielding a millable silicone rubber superior in heat resistance. Particularly, the silicone rubber obtained by curing the millable silicone rubber composition of the invention exhibits an excellent heat resistance at 200° C. or higher, especially at 250° C. or higher. Further, an increase in the hardness of such silicone rubber (cured product) can be prohibited. In addition, since the composition itself is white, it can be easily colored with a desired color by means of a colorant such as a pigment.

MODE FOR CARRYING OUT THE INVENTION

The composition of the present invention is described in detail hereunder.

Here, in this specification, a specific surface area refers to a value measured by BET method. A millable composition refers to a high-viscosity and non-liquid composition exhibiting no self-fluidity at room temperature (25° C.), and capable of being homogenously kneaded by a kneader such as a roll mill (e.g. double roll mill, triple roll mill) under a shear stress. Further, an organopolysiloxane raw rubber refers to a non-liquid organopolysiloxane component having a high polymerization degree (high viscosity), and exhibiting no self-fluidity at room temperature (25° C.).

(A) Organopolysiloxane

An organopolysiloxane as a component (A) is a main agent (base polymer) of the composition of the invention, and contains in one molecule at least two, preferably 2 to 10,000 silicon atom-bonded alkenyl groups.

It is preferred that the component (A) be that represented by the following average composition formula (1).

$$R^1_n SiO_{(4-n)/2} \quad (1)$$

(In the formula (1), $R^1$ represents an identical or different monovalent hydrocarbon group having 1 to 20 carbon atoms; n represents a positive number of 1.95 to 2.04.)

In the average composition formula (1), $R^1$ represents an identical or different monovalent hydrocarbon group having 1 to 20, preferably 1 to 12, and more preferably 1 to 8 carbon atoms. Examples of the monovalent hydrocarbon group represented by $R^1$ include alkyl groups such as a methyl group, an ethyl group, a propyl group and a butyl group; cycloalkyl groups such as a cyclohexyl group; alkenyl groups such as a vinyl group, an allyl group, a butenyl group and a hexenyl group; aryl groups such as a phenyl group and a tolyl group; and aralkyl groups such as β-phenylpropyl group. Here, a part of or all the carbon atom-bonded hydrogen atoms in any of these groups may be substituted by halogen atoms; such group may then be 3,3,3-trifluoropropyl group. Among the above groups, preferred are a methyl group, a vinyl group, a phenyl group and a trifluoropropyl group; and more preferred are a methyl group and a vinyl group. Particularly, it is preferred that not less than 50 mol %, more preferably not less than 80 mol % of the monovalent hydrocarbon groups represented by $R^1$ in the molecule be methyl groups. Further, it is preferred that all $R^1$s other than alkenyl groups be methyl groups.

In the average composition formula (1), n represents a positive number of 1.95 to 2.04, preferably a positive number of 1.98 to 2.02. When this value of n is not within the range of 1.95 to 2.04, a cured product obtained may not exhibit a sufficient rubber elasticity.

Further, it is required that the organopolysiloxane as the component (A) have at least two alkenyl groups in one molecule; in the above formula (1), it is preferred that 0.01 to 10 mol %, particularly preferably 0.01 to 5 mol % of $R^1$s be alkenyl groups. As such alkenyl groups, preferred are a vinyl group and an allyl group, and particularly preferred is a vinyl group.

It is preferred that the average polymerization degree of the organopolysiloxane as the component (A) be not lower than 100 (normally 100 to 100,000), more preferably 1,000 to 100,000, even more preferably 3,000 to 50,000, and particularly preferably 4,000 to 20,000. It is not preferable if the polymerization degree is lower than 100, because the silicone rubber composition of the invention will not exhibit the properties as a millable rubber, and a roll kneading performance or the like will be significantly impaired. This average polymerization degree is obtained based on a weight-average molecular weight in terms of polystyrene in a GPC (Gel Permeation Chromatography) analysis that was measured under the following conditions.

[Measurement Condition]
Developing solvent: Toluene
Flow rate: 1 mL/min
Detector: Differential refractometer (RI)
Column: KF-805L×two (by Shodex)
Column temperature: 25° C.
Sample injection volume: 30 μL (toluene solution with a concentration of 0.2% by mass)

There are no particular restrictions on the organopolysiloxane as the component (A) as long as the alkenyl groups and average polymerization degree thereof meet the above requirements. However, it is preferred that the organopolysiloxane be a linear diorganopolysiloxane that has a main chain composed of repeating diorganosiloxane units ($R^1_2SiO_{2/2}$, $R^1$ is defined above, the same applies hereafter), and has both molecular chain ends blocked by a triorganosiloxy group ($R^1_3SiO_{1/2}$). Here, it is preferred that such linear diorganopolysiloxane have both of its molecular chain ends blocked by, for example, a trimethylsiloxy group, a dimethylvinylsiloxy group, a dimethylhydroxysiloxy group, a methyldivinylsiloxy group or a trivinylsiloxy group, particularly preferably a siloxy group having at least one vinyl group. Any one kind of these organopolysiloxanes may be used singularly, or two or more kinds of them with different polymerization degrees and molecular structures may be used in combination.

It is preferred that the component (A) be contained in the composition of the invention by an amount of 43 to 96% by mass, more preferably 50 to 90% by mass, and even more preferably 60 to 80% by mass.

(B) Reinforcing Silica

A reinforcing silica as a component (B) serves as a filler for imparting superior mechanical properties to the silicone rubber composition obtained. This reinforcing silica may be a precipitated silica (wet silica) or a fumed silica (dry silica), and is that having multiple silanol (SiOH) groups on its surface. In the present invention, it is required that a specific surface area of the reinforcing silica as the component (B) that is measured by BET method be not smaller than 50 m²/g, preferably 100 to 400 m²/g. When such specific surface area is smaller than 50 m²/g, the reinforcing effect by the component (B) will be insufficient.

The reinforcing silica as the component (B) may be used in an untreated manner; or surface-treated before use, if necessary, with organosilicon compounds such as organopolysiloxane, organopolysilazane, chlorosilane and alkoxysilane. Any one kind of these reinforcing silicas may be used singularly, or two or more kinds of them may be used in combination.

The reinforcing silica as the component (B) is added in an amount of 5 to 100 parts by mass, preferably 10 to 80 parts by mass, more preferably 20 to 70 parts by mass, per 100 parts by mass of the organopolysiloxane as the component (A). When such amount added is out of these ranges, not only the silicone rubber composition obtained will exhibit an impaired workability, but a silicone rubber cured product obtained by curing such silicone rubber composition will exhibit insufficient mechanical properties such as an insufficient tensile strength and tear strength.

(C) Titanium Oxide Doped with Transition Metal Oxide

A titanium oxide doped with a transition metal oxide of an amount of 0.01 to 5% by mass, as a component (C), is a component capable of significantly improving the heat resistance of the silicone rubber.

In the present invention, "doped with" refers to a state where a transition metal oxide exists in the lattice of titanium oxide.

In the present invention, a transition metal oxide refers to a transition metal oxide other than titanium oxide which is to be doped and a later-described cerium oxide as a component (D). Examples of such transition metal oxide include manganese oxide, iron oxide, cobalt oxide, nickel oxide, copper oxide, zinc oxide and zirconium oxide, among which iron oxide (e.g. FeO, $Fe_2O_3$) is preferred.

The titanium oxide doped with the transition metal oxide, as the component (C), is produced by a known production method. For example, described in JP-A-2010-013484 is an example in which titanium tetrachloride and iron trichloride were used, and a crystalline titanium dioxide of anatase-type 80% and rutile-type 20% was doped with an iron oxide.

The titanium oxide doped with the transition metal oxide is added in an amount of 0.01 to 10 parts by mass, preferably 0.1 to 5 parts by mass, per 100 parts by mass of the organopolysiloxane as the component (A). When such amount added is smaller than 0.01 parts by mass, the heat resistance of the silicone rubber will not improve. When such amount added is larger than 10 parts by mass, the mechanical properties of the silicone rubber may deteriorate significantly.

Further, the content of the transition metal oxide with which titanium oxide has been doped is 0.01 to 5% by mass, preferably 0.1 to 5% by mass, more preferably 0.5 to 5% by mass. It is not preferable when such content is lower than 0.01% by mass, because there may not be achieved a sufficient effect of the transition metal oxide with which doping was performed. It is also not preferable when such content is higher than 5% by mass, because coloring with a color other than red will be difficult.

(D) Cerium Oxide and/or Cerium Hydroxide

Both cerium oxide and cerium hydroxide as a component(s) (D) are components capable of significantly improving the heat resistance of the silicone rubber, together with the component (C).

Examples of commercially available cerium oxides include SHOROX FL-2 (by Showa Denko K.K.), SN-2 (by NIKKI Corporation) and cerium oxide S (by Anan Kasei Co., Ltd.).

It is preferred that cerium oxide be added in an amount of 0.01 to 10 parts by mass, more preferably 0.1 to 5 parts by mass, per 100 parts by mass of the organopolysiloxane as the component (A). When such amount added is smaller than 0.01 parts by mass, the heat resistance of the silicone rubber will not improve. When such amount added is larger than 10 parts by mass, the mechanical properties of the silicone rubber may deteriorate significantly.

Examples of commercially available cerium hydroxide include a cerium hydroxide (by NIKKI Corporation) and Cerhydrate 90 (Treibacher Industrie AG).

The cerium hydroxide is added in an amount of 0.01 to 10 parts by mass, preferably 0.1 to 5 parts by mass, per 100 parts by mass of the organopolysiloxane as the component (A). When such amount of the cerium hydroxide added is smaller than 0.01 parts by mass, the heat resistance of the silicone rubber will not improve; when such amount of the cerium hydroxide added is larger than 10 parts by mass, the mechanical properties of the silicone rubber may deteriorate significantly. Here, each of the cerium oxide and cerium hydroxide may be used singularly, or both of them may be used in combination. If the cerium oxide and cerium hydroxide are used in combination, the total amount thereof is 0.01 to 10 parts by mass per 100 parts by mass of the component (A).

Particularly, a preferable composition ratio between the component (C) and the component (D) is 1:100 to 100:1 by mass, more preferably 1:50 to 50:1 by mass.

(E) Curing Agent

There are no particular restrictions on a curing agent as a component (E), provided that the curing agent employed is capable of curing the silicone rubber composition used in the present invention. One kind of such component (E) may be used singularly, or two or more kinds thereof may be used in combination. As the component (E), there can be employed, for example, an organic peroxide curing agent (E-1), an addition reaction-type curing agent (E-2), or a combination of the components (E-1) and (E-2).

(E-1) Organic Peroxide Curing Agent

Examples of the organic peroxide curing agent (E-1) include benzoyl peroxide, 2,4-dichlorobenzoyl peroxide, p-methylbenzoyl peroxide, o-methylbenzoyl peroxide, 2,4-dicumyl peroxide, 2,5-dimethyl-2,5-bis(t-butylperoxy) hexane, di-t-butyl peroxide, t-butyl perbenzoate, and 1,6-hexanediol-bis-t-butyl peroxycarbonate. The organic peroxide curing agent is added in an amount of 0.01 to 10 parts by mass, particularly preferably 0.02 to 5 parts by mass, per 100 parts by mass of the component (A). An excessively small amount of the organic peroxide curing agent (E-1) added may lead to an insufficient curing; and an excessively large amount thereof may cause the silicone rubber cured product to turn yellow due to a decomposition residue of the organic peroxide. Here, by adding both the components (E-1) and (E-2) into the component (A) in accordance with the abovementioned composition ratios, the silicone rubber composition may also be turned into a covulcanizable silicone rubber composition curable by addition reaction and organic peroxides.

(E-2) Addition Reaction Curing Agent

As the addition reaction curing agent (E-2), an organohydrogenpolysiloxane and a hydrosilylation catalyst are used in combination.

The organohydrogenpolysiloxane may have a linear, circular, branched or three-dimensional network structure, provided that there are approximately not less than two, preferably not less than three, more preferably 3 to 200, and even more preferably 4 to 100 silicon atom-bonded hydrogen atoms (i.e. SiH groups) in one molecule. Here, the SiH groups may be present at the molecular chain ends and/or in portions other than the molecular chain ends.

As such organohydrogenpolysiloxane, there can be employed an organohydrogenpolysiloxane known as a cross-linking agent for an addition reaction-type silicone rubber composition. For example, there may be used an organohydrogenpolysiloxane represented by the following average composition formula (2).

$$R^{20}_p H_q SiO_{(4-p-q)/2} \qquad (2)$$

In the average composition formula (2), $R^{20}$ represents an identical or different monovalent hydrocarbon group preferably having no aliphatic unsaturated bond. The monovalent hydrocarbon group represented by $R^{20}$ has 1 to 12 carbon atoms, particularly preferably 1 to 8 carbon atoms. Specific examples of such monovalent hydrocarbon group include alkyl groups such as a methyl group, an ethyl group and a propyl group; cycloalkyl groups such as a cyclohexyl group; aryl groups such as a phenyl group and a tolyl group; and aralkyl groups such as a benzyl group, 2-phenylethyl group and 2-phenylpropyl group. Here, a part of or all the hydrogen atoms in any of these groups may be substituted by, for example, halogen atoms. A substituted group may thus be 3,3,3-trifluoropropyl group, for example.

Further, p and q are positive numbers. Particularly, p satisfies $0<p<3$, preferably $0.5 \leq p \leq 2.2$, more preferably $1.0 \leq p \leq 2.0$. Further, q satisfies $0<q<3$, preferably $0.002 \leq q \leq 1.1$, more preferably $0.005 \leq q \leq 1$. Furthermore, p+q satisfies $0<p+q \leq 3$, preferably $1 \leq p+q \leq 3$, more preferably $1.002 \leq p+q \leq 2.7$.

Moreover, it is preferred that this organohydrogenpolysiloxane be that exhibiting a viscosity of 0.5 to 10,000 mPa·s, particularly preferably 1 to 300 mPa·s when measured by a rotary viscometer at 25° C. in accordance with a method described in JIS K7117-1:1999.

Specific examples of such organohydrogenpolysiloxane include 1,1,3,3-tetramethyldisiloxane; 1,3,5,7-tetramethylcyclotetrasiloxane; tris(hydrogendimethylsiloxy)methylsilane; tris(hydrogendimethylsiloxy)phenylsilane; methylhydrogencyclopolysiloxane; methylhydrogensiloxane-dimethylsiloxane cyclic copolymer; methylhydrogenpolysiloxane with both ends blocked by a trimethylsiloxy group; dimethylsiloxane-methylhydrogensiloxane copolymer with both ends blocked by a trimethylsiloxy group; dimethylpolysiloxane with both ends blocked by a dimethylhydrogensiloxy group; dimethylsiloxane-methylhydrogensiloxane copolymer with both ends blocked by a dimethylhydrogensiloxy group; methylhydrogensiloxane-diphenylsiloxane copolymer with both ends blocked by a trimethylsiloxy group; methylhydrogensiloxane-diphenylsiloxane-dimethylsiloxane copolymer with both ends blocked by a trimethylsiloxy group; methylhydrogensiloxane-methylphenylsiloxane-dimethylsiloxane copolymer with both ends blocked by a trimethylsiloxy group; methylhydrogensiloxane-dimethylsiloxane-diphenylsiloxane copolymer with both ends blocked by a dimethylhydrogensiloxy group; methylhydrogensiloxane-dimethylsiloxane-methylphenylsiloxane copolymer with both ends blocked by a dimethylhydrogensiloxy group; copolymer composed of $(CH_3)_2HSiO_{1/2}$ unit, $(CH_3)_3SiO_{1/2}$ unit and $SiO_{4/2}$ unit; copolymer composed of $(CH_3)_2HSiO_{1/2}$ unit and $SiO_{4/2}$ unit; copolymer composed of $(CH_3)_2HSiO_{1/2}$ unit, $SiO_{4/2}$ unit and $(C_6H_5)_3SiO_{1/2}$ unit; and compounds prepared by substituting a part of or all the methyl groups in any of the above listed compounds with, for example, alkyl group and phenyl group as other groups.

It is preferred that the above organohydrogenpolysiloxane be added in an amount of 0.01 to 10 parts by mass per 100 parts by mass of the component (A). Further, a suitable ratio of the silicon atom-bonded hydrogen atoms (SiH groups) to one alkenyl group in the component (A) is within a range of 0.5 to 10, preferably 0.7 to 5. When such number of the silicon atom-bonded hydrogen atoms is smaller than 0.5, cross-linking will be insufficient such that a sufficient mechanical strength may not be achieved. Moreover, when such number of the silicon atom-bonded hydrogen atoms is larger than 10, physical properties after curing will deteriorate; especially, the heat resistance of the silicone rubber may deteriorate, and a larger compression set may be observed.

A hydrosilylation catalyst is a catalyst for promoting a hydrosilylation addition reaction between the alkenyl groups in the component (A) and the silicon atom-bonded hydrogen atoms (SiH groups) in the organohydrogenpolysiloxane. A hydrosilylation catalyst may be a platinum group metal-based catalyst, examples of which include a platinum group metal element and compounds thereof. As such catalyst, there may be used known catalyst for an addition reaction curing-type silicone rubber composition. For example, there may be used a platinum catalyst, a palladium catalyst and a rhodium catalyst, the examples of such platinum catalyst including a particulate platinum metal adsorbed on a carrier such as silica, alumina or silica gel, platinic chloride, chloroplatinic acid and an alcohol solution of chloroplatinic acid hexahydrate. Here, platinum or platinum compounds (platinum catalysts) are preferred.

This catalyst is only added in an amount capable of promoting the addition reaction; and is normally used in an amount of 1 ppm by mass to 1% by mass, preferably 10 to 500 ppm by mass, in terms of the amount of platinum group metal and with respect to the organopolysiloxane as the component (A). When such amount added is smaller than 1 ppm by mass, the addition reaction will be promoted in an insufficient manner such that curing may take place in an insufficient manner as well; when such amount added is larger than 1% by mass, an little impact will be imposed on reactivity, and an economic disadvantage may thus be incurred.

(F) Dispersant for Filler

In the present invention, in addition to the components (A) to (E), as a dispersant for filler such as the reinforcing silica as the component (B), there may be used various alkoxysilanes such as a phenyl group-containing alkoxysilane and hydrolysates thereof in particular; diphenylsilanediol; a carbonfunctional silane; and a silanol group-containing low-molecular siloxane. Among the above examples, it is preferable if diphenylsilanediol is used, because the heat resistance of the silicone rubber can be further improved; it is more preferable if diphenylsilanediol is used in combination with alkylalkoxysilane or a hydrolysate thereof, because the dispersibility of the filler can be further improved.

If using the component (F), it is preferred that it be used in an amount of 0.1 to 50 parts by mass, particularly preferably 1 to 20 parts by mass, per 100 parts by mass of the component (A). When an organopolysiloxane with both ends blocked by a silanol group is used in an excessively small amount, no effects owing to addition will be observed; when such organopolysiloxane is used in an excessively large amount, the composition will exhibit an extremely low degree of plasticity such that a roller workability may be impaired as roller adhesion occurs in a kneading device such as a roll mill.

—Other Components—

In addition to the above components, there may also be added to the silicone rubber composition of the invention, if necessary, other components such as a filler other than the component (B) (e.g. crushed quartz, diatom earth and calcium carbonate), a colorant (pigment), a tearing strength improving agent, a flame retardancy improving agent (e.g. platinum compound), an acid acceptor, a thermal conductivity improving agent (e.g. alumina, boron nitride), a mold release agent and a reaction controlling agent which are all known fillers and additives used in a heat-curable silicone rubber composition, provided that the effects of the invention will not be impaired. Any one kind of these other components may be used singularly, or two or more kinds of them may be used in combination.

—Method for Producing Composition—

The millable silicone rubber composition of the present invention can be obtained by mixing the components composing the composition with a known kneading device such as a kneader, a Banbury mixer and a double roll mill. If the silicone rubber composition employed is a composition containing the above components (A) to (E), it is preferred that a mixture be at first prepared by mixing the organopolysiloxane as the component (A); the reinforcing silica as the component (B); the titanium oxide doped with an iron oxide of not more than 5% by mass, as the component (C); and the cerium oxide as the component (D), followed by adding the curing agent as the component (E) to such mixture. If the composition containing the components (A) to (E) further contains an other component(s), it is preferred that a mixture be at first prepared by mixing the organopolysiloxane as the component (A); the reinforcing silica as the component (B); the titanium oxide doped with an iron oxide of not more than 5% by mass, as the component (C); the cerium oxide as the component (D); and the other component(s), followed by adding the curing agent as the component (E) to such mixture.

—Silicone Rubber Molded Product—

As a molding method, there may be selected a known molding method in accordance with the shape and size of a target molded product. For example, there may be employed methods such as cast molding, compression molding, injection molding, calender molding and extrusion molding.

—Cured Product—

Curing conditions may be known conditions in a molding method employed, and are usually 60 to 450° C. for about several seconds to a day. Further, post curing (secondary curing) may be performed in, for example, an oven of 200° C. or higher, preferably 200 to 250° C. for an hour or longer, preferably about 1 to 70 hours, more preferably 1 to 10 hours, for the purposes of, for example, reducing the compression set of the cured product obtained, reducing the low-molecular siloxane component remaining in the silicone rubber obtained, and eliminating the degradant of the organic peroxide in such silicone rubber.

WORKING EXAMPLES

The present invention is described in greater detail hereunder with reference to working and comparative examples, for the purpose of further clarifying the effects of the invention. However, the invention is not limited to these examples.

Evaluations of the working examples were performed as follows.

Pigment Colorability

A double roll mill was used to add 0.5 parts by mass of a yellow pigment (product name: KE-COLOR-Y-064 by Shin-Etsu Chemical Co., Ltd.) to 100 parts by mass of the silicone rubber composition prepared in each of the following working and comparative examples. The tone of the composition was visually confirmed before and after adding the pigment. The results thereof are shown in Table 1.

Heat Resistance

The silicone rubber composition prepared in each of the following working and comparative examples was turned into a specimen sheet in accordance with JIS K 6249:2003. Using such specimen sheet, measured were initial values of hardness (durometer A), tensile strength (MPa) and elongation at break (%). Further, after keeping the specimen sheet in a dryer of 300° C. for 3 days, in a dryer of 250° C. for 5 days, or in a dryer of 250° C. for 10 days, the hardness, tensile strength and elongation at break of this specimen sheet were again measured. The results thereof are shown in Table 1. In addition, Table 1 shows the content (% by mass) of an iron oxide with which the titanium oxide as the component (C) was doped in the silicone rubber composition of each of the following working and comparative examples.

Working Example 1

Added were 100 parts by mass of an organopolysiloxane raw rubber composed of 99.85 mol % of dimethylsiloxane units, 0.125 mol % of methylvinylsiloxane units and 0.025 mol % of dimethylvinylsiloxy units, and having an average polymerization degree of 6,000; 40 parts by mass of a fumed silica (AEROSIL 200 by NIPPON AEROSIL CO., LTD) having a BET specific surface area of 200 m$^2$/g; 5 parts by mass of diphenylsilanediol; and 2 parts by mass of a dimethylpolysiloxane having a silanol group at both ends, having an average polymerization degree of 4, and exhibiting a viscosity of 15 mPa·s at 25° C., followed by heating while mixing them using a kneader at 170° C. for two hours, thereby obtaining a base compound (1).

Per 100 parts by mass of the organopolysiloxane raw rubber, further added to such base compound (1), using a double roll mill, were 0.74 parts by mass of a titanium oxide doped with an iron oxide (Fe$_2$O$_3$) of 3% by mass (AEROXIDE TiO2 PF2 by NIPPON AEROSIL CO., LTD); and 1.47 parts by mass of a cerium oxide (SN-2 by NIKKI Corporation), thereby obtaining a compound (A).

Per 100 parts by mass of the organopolysiloxane raw rubber, 0.6 parts by mass of 2.5-dimethyl-2,5-bis(t-butylperoxy)hexane as a curing agent were further added to and homogenously mixed with the compound (A), using a double roll mill, thereby obtaining a raw rubber-like silicone rubber composition. This composition was then press-cured under a condition of 165° C., 70 kgf/cm$^2$ for 10 min to produce a specimen sheet having a thickness of 2 mm. Next, this specimen sheet was post-cured in an oven of 200° C. for four hours, followed by measuring the initial values of its hardness, tensile strength and elongation at break. The specimen sheet was further kept in a dryer of 300° C. for 3 days, in a dryer of 250° C. for 5 days or in a dryer of 250° C. for 10 days, followed by again measuring its hardness, tensile strength and elongation at break.

Working Example 2

A silicone rubber composition was prepared and had its hardness, tensile strength and elongation at break measured in a similar manner as the working example 1, except that the additive amount of the titanium oxide doped with the iron oxide of 3% by mass (AEROXIDE TiO2 PF2 by NIPPON AEROSIL CO., LTD) was 1.47 parts by mass per 100 parts by mass of the organopolysiloxane raw rubber.

Working Example 3

A silicone rubber composition was prepared and had its hardness, tensile strength and elongation at break measured in a similar manner as the working example 1, except that diphenylsilanediol was not added, and that there were used 6 parts by mass of the dimethylpolysiloxane having a silanol group at both ends, having the average polymerization degree of 4, and exhibiting the viscosity of 15 mPa·s at 25° C.

Working Example 4

Per 100 parts by mass of the organopolysiloxane raw rubber, added to and homogenously mixed with the above compound (A), using a double roll mill, were: as a curing agent, 0.37 parts by mass of a methylhydrogenpolysiloxane having SiH groups on its side chains (dimethylsiloxane-methylhydrogensiloxane copolymer with both ends blocked by a trimethylsiloxy group, having a polymerization degree of 38 and containing 0.0074 mol % of SiH groups); as a reaction controlling agent, 0.07 parts by mass of ethynyl-cyclohexanol; and 0.15 parts by mass of a platinum catalyst (Pt concentration 1% by mass), thereby obtaining a raw rubber-like silicone rubber composition. This composition was then press-cured under a condition of 120° C., 70 kgf/cm² for 10 min to produce a specimen sheet having a thickness of 2 mm. Next, this specimen sheet was post-cured in an oven of 200° C. for four hours, followed by measuring the initial values of its hardness, tensile strength and elongation at break. The specimen sheet was further kept in a dryer of 300° C. for 3 days, in a dryer of 250° C. for 5 days or in a dryer of 250° C. for 10 days, followed by again measuring its hardness, tensile strength and elongation at break.

Working Example 5

A silicone rubber composition was prepared and had its hardness, tensile strength and elongation at break measured in a similar manner as the working example 1, except that instead of the cerium oxide (SN-2 by NIKKI Corporation), the cerium hydroxide (Cerhydrate 90 by Treibacher Industrie AG) was used.

Comparative Example 1

A silicone rubber composition was prepared and had its hardness, tensile strength and elongation at break measured in a similar manner as the working example 1, except that cerium oxide was not added.

Comparative Example 2

A silicone rubber composition was prepared and had its hardness, tensile strength and elongation at break measured in a similar manner as the working example 1, except that a titanium oxide doped with an iron oxide of 3% by mass was not added.

Comparative Example 3

A silicone rubber composition was prepared and had its hardness, tensile strength and elongation at break measured in a similar manner as the working example 1, except that instead of a titanium oxide doped with an iron oxide of 3% by mass, there were added 1.47 parts by mass of a titanium oxide (AEROXIDE TiO2 P25 by NIPPON AEROSIL CO., LTD) and 0.074 parts by mass of an iron oxide (Rough SR-570 by Tone Sangyo Co., Ltd.), per 100 parts by mass of the organopolysiloxane raw rubber.

Comparative Example 4

A silicone rubber composition was prepared and had its hardness, tensile strength and elongation at break measured in a similar manner as the working example 4, except that there were not added a cerium oxide and a titanium oxide doped with an iron oxide of 3% by mass.

Comparative Example 5

A silicone rubber composition was prepared and had its hardness, tensile strength and elongation at break measured in a similar manner as the working example 5, except that a titanium oxide doped with an iron oxide of 3% by mass was not added.

Comparative Reference Example 1

A base compound (2) was prepared in a similar manner as the working example 1, except that the organopolysiloxane raw rubber composed of 99.85 mol % of dimethylsiloxane units, 0.125 mol % of methylvinylsiloxane units and 0.025 mol % of dimethylvinylsiloxy units, and having an average polymerization degree of 6,000 was changed to a dimethylpolysiloxane with both ends blocked by a dimethylvinylsiloxy group and having an average polymerization degree of 90.

This base compound (2) was in the form of a liquid, and failed to be kneaded with a double roll mill (not shown in Table 1).

TABLE 1

|   |   | Working example | | | | |
|---|---|---|---|---|---|---|
|   |   | 1 | 2 | 3 | 4 | 5 |
| (A) | Organopolysiloxane raw rubber composed of 99.850 mol % of dimethylsiloxane units, 0.125 mol % of methylvinylsiloxane units and 0.025 mol % of dimethylvinylsiloxy units (Average polymerization degree 6,000) | 100 | 100 | 100 | 100 | 100 |

TABLE 1-continued

| | | | | | | | |
|---|---|---|---|---|---|---|---|
| (B) | Fumed silica (AEROSIL 200) | | 40 | 40 | 40 | 40 | 40 |
| (F) | Diphenylsilanediol | | 5 | 5 | 5 | 5 | 5 |
| | Dimethylpolysiloxane with both ends blocked by silanol group (Average polymerization degree 4; Viscosity 15 mPa · s) | | 2 | 2 | 6 | 2 | 2 |
| (C) | Titanium oxide doped with ferric oxide of 3% by mass | | 0.74 | 1.47 | 0.74 | 0.74 | 0.74 |
| | Titanium oxide | | | | | | |
| | Ferric oxide | | | | | | |
| (D) | Cerium oxide | | 1.47 | 1.47 | 1.47 | 1.47 | |
| | Cerium hydroxide | | | | | | 1.47 |
| (E-1) | 2,5-dimethyl-2,5-bis(t-butylperoxy)hexane | | 0.6 | 0.6 | 0.6 | | 0.6 |
| (E-2) | Dimethylsiloxane-methylhydrogensiloxane copolymer with both ends blocked by trimethylsiloxy group (Polymerization degree 38, SiH group 0.0074 mol) | | | | | 0.37 | |
| | Platinum catalyst (Pt concentration 1% by mass) | | | | | 0.15 | |
| | Ethynylcyclohexanol | | | | | 0.07 | |
| | Content rate of ferric oxide doped (% by mass) | | 0.015 | 0.029 | 0.015 | 0.015 | 0.015 |
| | Pigment colorability | Before adding pigment | White | White | White | White | White |
| | | After adding pigment | Yellow | Yellow | Yellow | Yellow | Yellow |
| Heat resistance | Hardness (Durometer A) | Initial value | 50 | 51 | 49 | 50 | 50 |
| | | 300° C. for 3 days | 61 | 60 | 63 | 62 | 62 |
| | | 250° C. for 5 days | 53 | 52 | 54 | 54 | 55 |
| | | 250° C. for 10 days | 55 | 56 | 56 | 55 | 59 |
| | Tensile strength (MPa) | Initial value | 11.4 | 10.1 | 10.1 | 11.5 | 10.5 |
| | | 300° C. for 3 days | 52 | 5.4 | 5.0 | 5.0 | 5.2 |
| | | 250° C. for 5 days | 6.2 | 6.5 | 5.9 | 6.0 | 6.1 |
| | | 250° C. for 10 days | 6.0 | 6.2 | 5.5 | 5.7 | 5.2 |
| | Elongation at break (%) | Initial value | 560 | 570 | 630 | 580 | 630 |
| | | 300° C. for 3 days | 290 | 300 | 290 | 270 | 300 |
| | | 250° C. for 5 days | 360 | 380 | 350 | 350 | 340 |
| | | 250° C. for 10 days | 340 | 350 | 330 | 320 | 300 |

| | | | Comparative example | | | | |
|---|---|---|---|---|---|---|---|
| | | | 1 | 2 | 3 | 4 | 5 |
| (A) | Organopolysiloxane raw rubber composed of 99.850 mol % of dimethylsiloxane units, 0.125 mol % of methylvinylsiloxane units and 0.025 mol % of dimethylvinylsiloxy units (Average polymerization degree 6,000) | | 100 | 100 | 100 | 100 | 100 |
| (B) | Fumed silica (AEROSIL 200) | | 40 | 40 | 40 | 40 | 40 |
| (F) | Diphenylsilanediol | | 5 | 5 | 5 | 5 | 5 |
| | Dimethylpolysiloxane with both ends blocked by silanol group (Average polymerization degree 4; Viscosity 15 mPa · s) | | 2 | 2 | 2 | 2 | 2 |
| (C) | Titanium oxide doped with ferric oxide of 3% by mass | | 0.74 | | | | |
| | Titanium oxide | | | | 1.47 | | |
| | Ferric oxide | | | | 0.074 | | |
| (D) | Cerium oxide | | | 1.47 | 1.47 | | |
| | Cerium hydroxide | | | | | | 1.47 |
| (E-1) | 2,5-dimethyl-2,5-bis(t-butylperoxy)hexane | | 0.6 | 0.6 | 0.6 | | 0.6 |
| (E-2) | Dimethylsiloxane-methylhydrogensiloxane copolymer with both ends blocked by trimethylsiloxy group (Polymerization degree 38, SiH group 0.0074 mol) | | | | | 0.37 | |
| | Platinum catalyst (Pt concentration 1% by mass) | | | | | 0.15 | |
| | Ethynylcyclohexanol | | | | | 0.07 | |
| | Content rate of ferric oxide doped (% by mass) | | 0.015 | 0.000 | 0.000 | 0.000 | 0.000 |
| | Pigment colorability | Before adding pigment | White | White | Red | Milky white | White |
| | | After adding pigment | Yellow | Yellow | Red | Yellow | Yellow |
| Heat resistance | Hardness (Durometer A) | Initial value | 50 | 49 | 50 | 51 | 50 |
| | | 300° C. for 3 days | 61 | 66 | 68 | 88 | 67 |
| | | 250° C. for 5 days | 57 | 52 | 53 | 75 | 51 |
| | | 250° C. for 10 days | 68 | 56 | 55 | 89 | 55 |
| | Tensile strength (MPa) | Initial value | 11.2 | 11.7 | 10.8 | 10.8 | 11.3 |
| | | 300° C. for 3 days | 5.0 | 3.7 | 3.2 | Unmeasurable | 3.2 |
| | | 250° C. for 5 days | 5.8 | 6.2 | 5.9 | Unmeasurable | 6.1 |
| | | 250° C. for 10 days | 3.1 | 5.9 | 5.4 | Unmeasurable | 5.5 |
| | Elongation at break (%) | Initial value | 550 | 580 | 560 | 590 | 590 |
| | | 300° C. for 3 days | 300 | 170 | 150 | Unmeasurable | 150 |
| | | 250° C. for 5 days | 320 | 350 | 340 | Unmeasurable | 340 |
| | | 250° C. for 10 days | 190 | 320 | 310 | Unmeasurable | 310 |

The invention claimed is:

1. A heat-resistant millable silicone rubber composition comprising:
   (A) 100 parts by mass of an organopolysiloxane having at least two silicon atom-bonded alkenyl groups in one molecule, and having an average polymerization degree of not lower than 100;
   (B) 5 to 100 parts by mass of a reinforcing silica having a specific surface area of not smaller than 50 $m^2/g$;
   (C) 0.01 to 10 parts by mass of a titanium oxide doped with a transition metal oxide of 0.01 to 5% by mass;
   (D) 0.01 to 10 parts by mass of a cerium oxide and/or a cerium hydroxide; and
   (E) 0.01 to 10 parts by mass of a curing agent.

2. The heat-resistant millable silicone rubber composition according to claim 1, wherein a content of the transition metal oxide in the silicone rubber composition is 0.001 to 0.1% by mass.

3. The heat-resistant millable silicone rubber composition according to claim 1 or 2, wherein the transition metal oxide is an iron oxide.

4. The heat-resistant millable silicone rubber composition according to claim 1, further comprising a dispersant for filler, as a component (F).

5. The heat-resistant millable silicone rubber composition according to claim 1, wherein the component (E) is an organic peroxide.

6. The heat-resistant millable silicone rubber composition according to claim 1, wherein the component (E) is composed of an organohydrogenpolysiloxane and a platinum group metal catalyst.

7. A cured product of the heat-resistant millable silicone rubber composition according to claim 1.

* * * * *